March 26, 1957
A. ASBURY
2,786,974
AUTOMATIC VOLTAGE CONTROL SYSTEMS
Filed Dec. 21, 1954
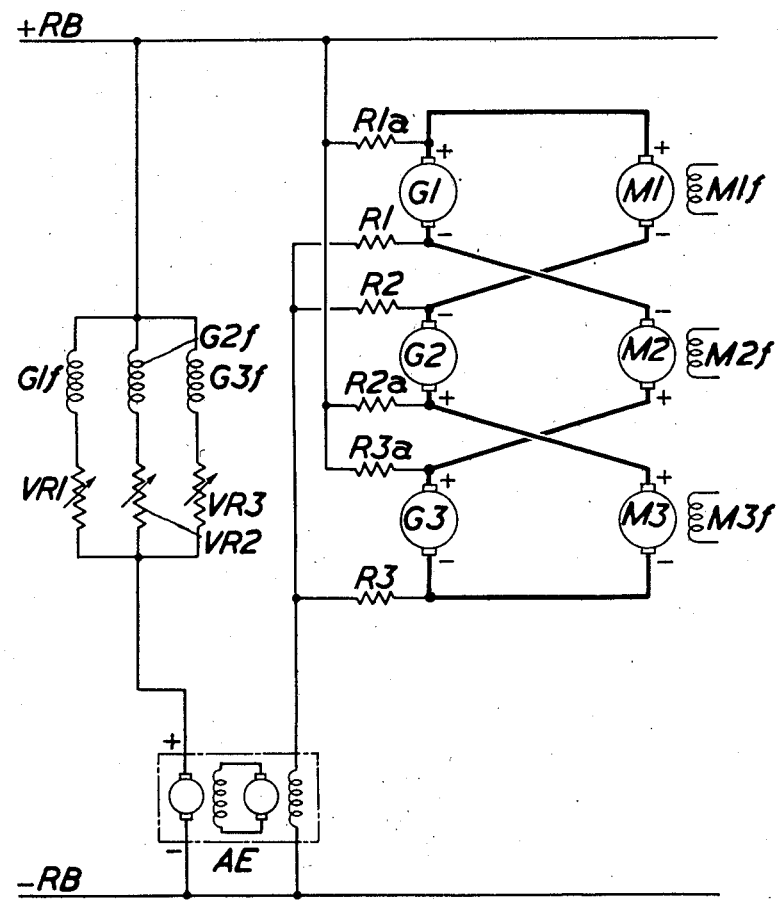

United States Patent Office 2,786,974
Patented Mar. 26, 1957

2,786,974

AUTOMATIC VOLTAGE CONTROL SYSTEMS

Allan Asbury, Stafford, England, assignor to The English Electric Company Limited, London, England, a British company Application December 21, 1954, Serial No. 476,638

Claims priority, application Great Britain January 5, 1954

4 Claims. (Cl. 318—149)

This invention relates to an automatic voltage control system for a plurality of separately excited, direct current generators, connected to supply a plurality of mechanically connected direct current motors, the generator and motor armatures being connected in a closed series load circuit with the motor armatures and the generator armatures arranged alternately.

According to the invention the system comprises, in combination, a reference voltage source, means for producing a voltage dependent on the mean of the generator output voltages, and automatic regulating means connected to vary the excitation of all the generators simultaneously in a corrective sense in accordance with deviation from a predetermined relationship between the voltage of the reference source and the voltage dependent on the mean of the generator output voltages.

The automatic regulating means may comprise an electrical amplifying device having output circuit means and input circuit means, the output circuit means being connected in circuit with the generator field windings so as to vary the excitation of all the generators simultaneously, and the input circuit means being connected both to said reference voltage source and to said means for producing the voltage dependent on the mean of the generator output voltages whereby the output of said amplifying device is varied in accordance with the difference between the two voltages.

Preferably the means for producing a voltage dependent on the mean of the generator output voltages comprises separate circuit means connecting the generator armatures in parallel, each circuit means including at each side of the associated generator armature a resistor of a sufficiently high value as not to affect the series load circuit, said input circuit means on the electrical amplifying device being connected in series with the paralleled circuit means across said reference voltage source so as to respond to the difference between the reference voltage and the voltage across said paralleled circuit means.

Other features of the invention will appear from the following description with reference to the accompanying drawing which shows the relevant part of the circuit diagram for one stand of a tandem mill embodying the invention.

Referring now to the drawing, the mill stand, not shown, is driven by three separately excited direct current motors the armatures M1, M2 and M3 of which are connected in series relationship with the armatures G1, G2 and G3 of three variable voltage separately excited direct current generators, the motor armatures and the generator armatures being arranged alternately in the series load circuit. The motor field windings are indicated at M1f etc. and the generator field windings at G1f etc. The motor armatures are mechanically coupled together.

The field windings of the three generators are connected in parallel with each other through individual field rheostats VR1, VR2 and VR3 respectively and the paralleled circuits are connected in series with the output side of an amplifying exciter AE across the mill reference busbars RB. The maximum output voltage of the amplifying exciter is small compared with the voltage across the reference busbars. The input side of the amplifying exciter is connected across the reference busbars through three parallel circuits. One circuit includes in series relationship the resistor R1, the generator armature G1 and the resistor R1a, the second circuit includes in series relationship the resistor R2, the generator armature G2 and the resistor R2a, whilst the third circuit includes in series relationship the resistor R3, the generator armature G3 and the resistor R3a. The ohmic value of each resistor is approximately 1,000 times the resistance of the associated generator armature so that the series load circuit will not be affected by these parallel connections.

Each of the three parallel circuits is arranged so that the output voltage of the associated generator opposes the voltage at the reference busbars RB and, since the three generator armatures are connected in parallel relationship with each other, the actual voltage opposing the reference voltage will be the mean output voltage of the three generators. The amplifying exciter AE will therefore be energized in accordance with the difference between the mean output voltage of the generators and th reference voltage and any variation of this relationship will vary the output of the amplifying exciter, the output circuit of the amplifying exciter being connected so that variation of the exciter output results in the excitation of the generator field windings being varied in a sense to restore the relationship between the mean output voltage of the three generators and the reference voltage.

The three field rheostats are preset so that, with the generators operating at full excitation voltage, the output voltage of each generator is substantially the same. Under these conditions therefore, slight changes in the relative values of the generator field resistances and of the generator armature resistances, will have little effect on the mean of the generator output voltages. On the other hand with the generators working at, say, half full excitation voltage, the generator output voltages may be appreciably different and it is under these conditions that the maximum benefit is derived by comparing the mean of the three generator output voltages with the reference voltage.

The amplifying exciter may be replaced by other forms of amplifying devices such as, for example, a magnetic amplifier or an electronic amplifier.

What I claim as my invention and desire to secure by Letters Patent is:

1. An automatic voltage control system for a plurality of separately excited, direct current generators, connected to supply a plurality of mechanically connected direct current motors, the generator and motor armatures being connected in a closed series load circuit with the motor armatures and the generator armatures arranged alternately comprising, in combination, a reference voltage source, means for producing a voltage dependent on the mean of the generator output voltages, and automatic regulating means connected to vary the excitation of all the generators simultaneously in a corrective sense in accordance with deviation from a predetermined relationship between the voltage of the reference source and the voltage dependent on the mean of the generator output voltages.

2. An automatic voltage control system according to claim 1, wherein said automatic regulating means comprise an electrical amplifying device having output circuit means and input circuit means, the output circuit means being connected in circuit with the generator field windings so as to vary the excitation of all the generators simultaneously, and the input circuit means being connected both to said reference voltage source and to said means for producing the voltage dependent on the mean of the generator output voltages whereby the output of said amplifying device is varied in accordance with the difference between the two voltages.

3. An automatic voltage control system according to claim 2, wherein said means for producing a voltage dependent on the mean of the generator output voltages comprises separate circuit means connecting the generator aramatures in parallel, each circuit means including at each side of the associated generator armature a resistor of a sufficiently high value as not to affect the series load circuit, said input circuit means on the electrical amplifying device being connected in series with the paralleled circuit means across said reference voltage source so as to respond to the difference between the reference voltage and the voltage across said paralleled circuit means.

4. An automatic voltage control system according to claim 3, wherein the field windings of the separate generators are connected in parallel through circuit means including separate excitation adjusting means in each circuit means, the paralleled circuit means being connected in series with the output circuit means of said amplifying device across said reference voltage source.

References Cited in the file of this patent
UNITED STATES PATENTS 1,871,698    James et al. _____ Aug. 16, 1932